INVENTORS
NELSON BERMAN
SHELDON GIRSCH
BY
ATTORNEY

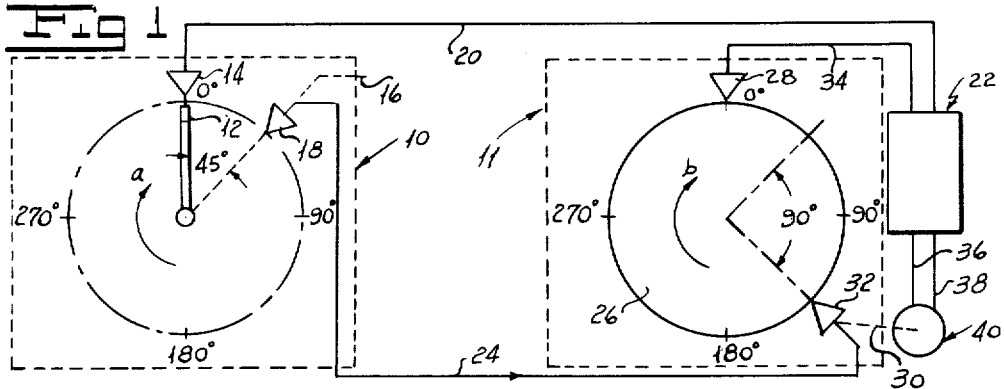
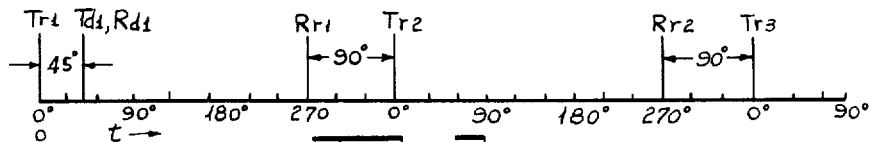
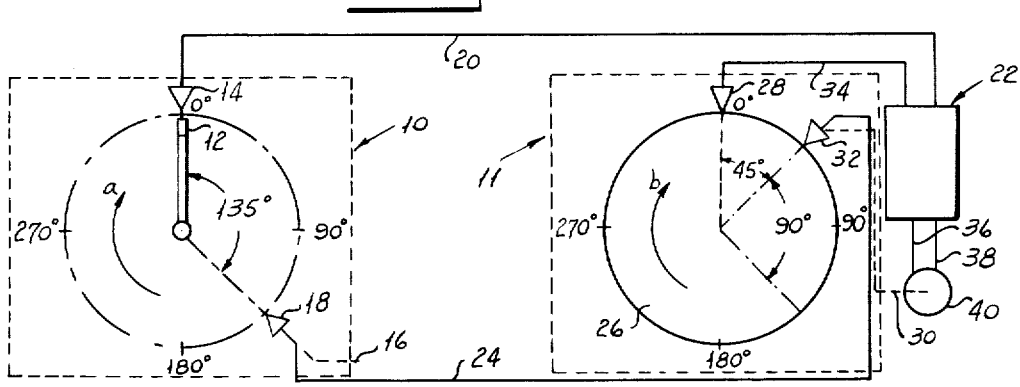
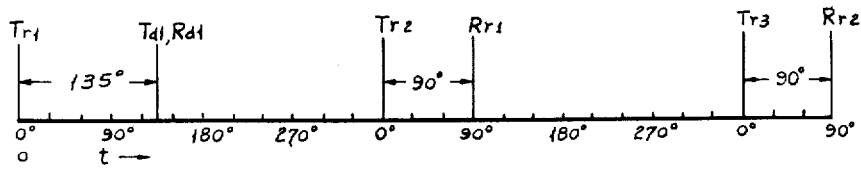

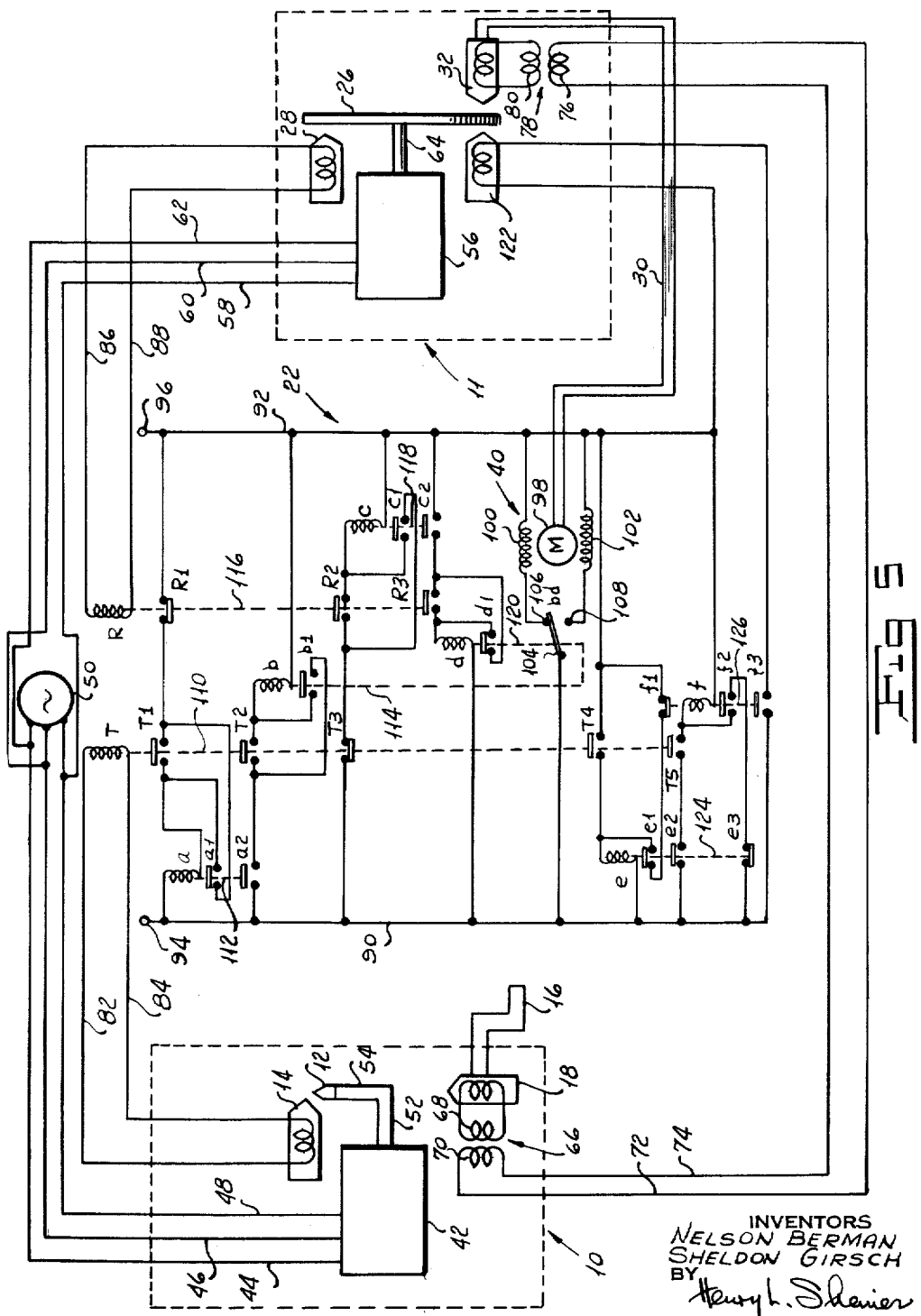

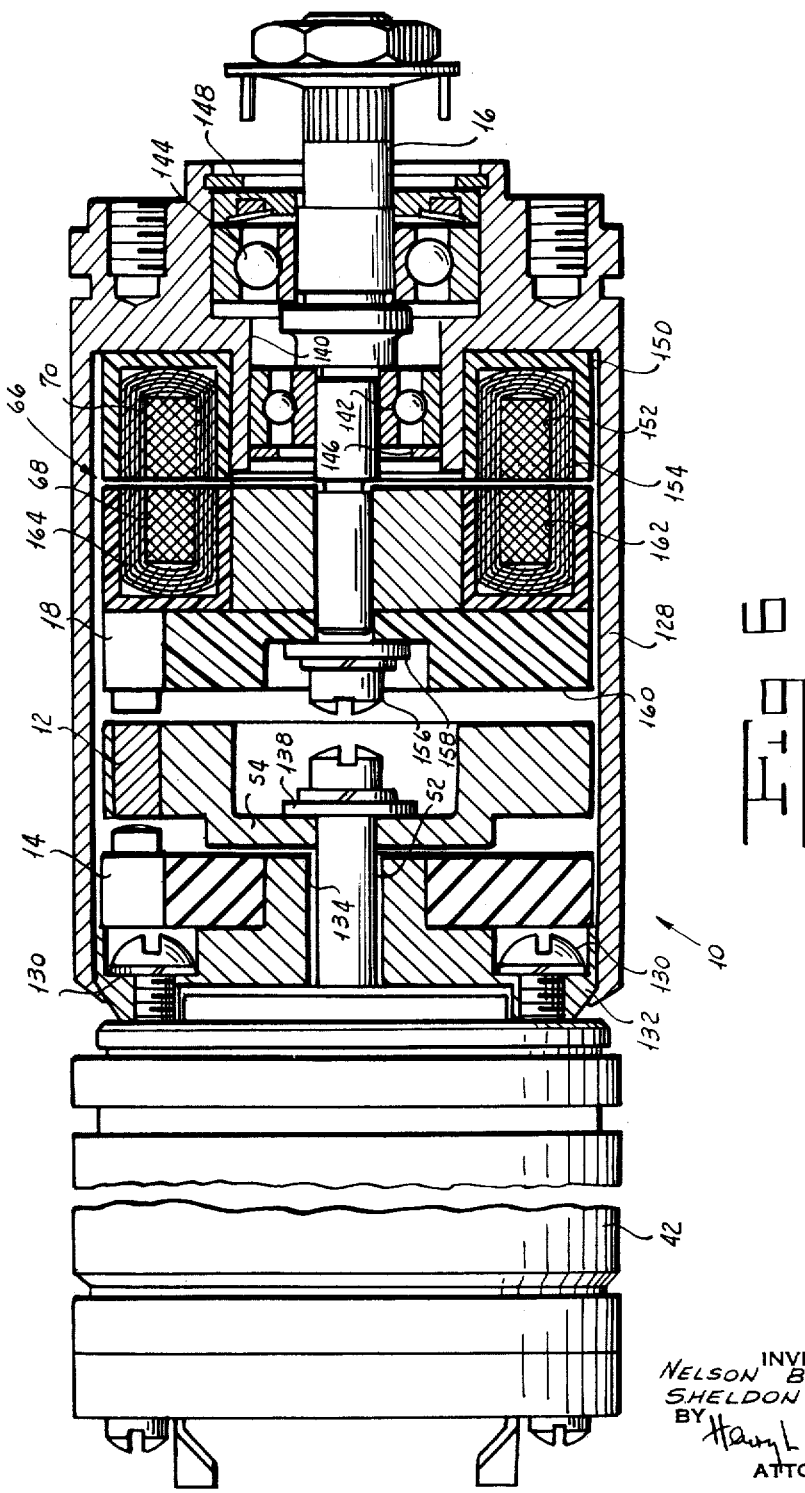

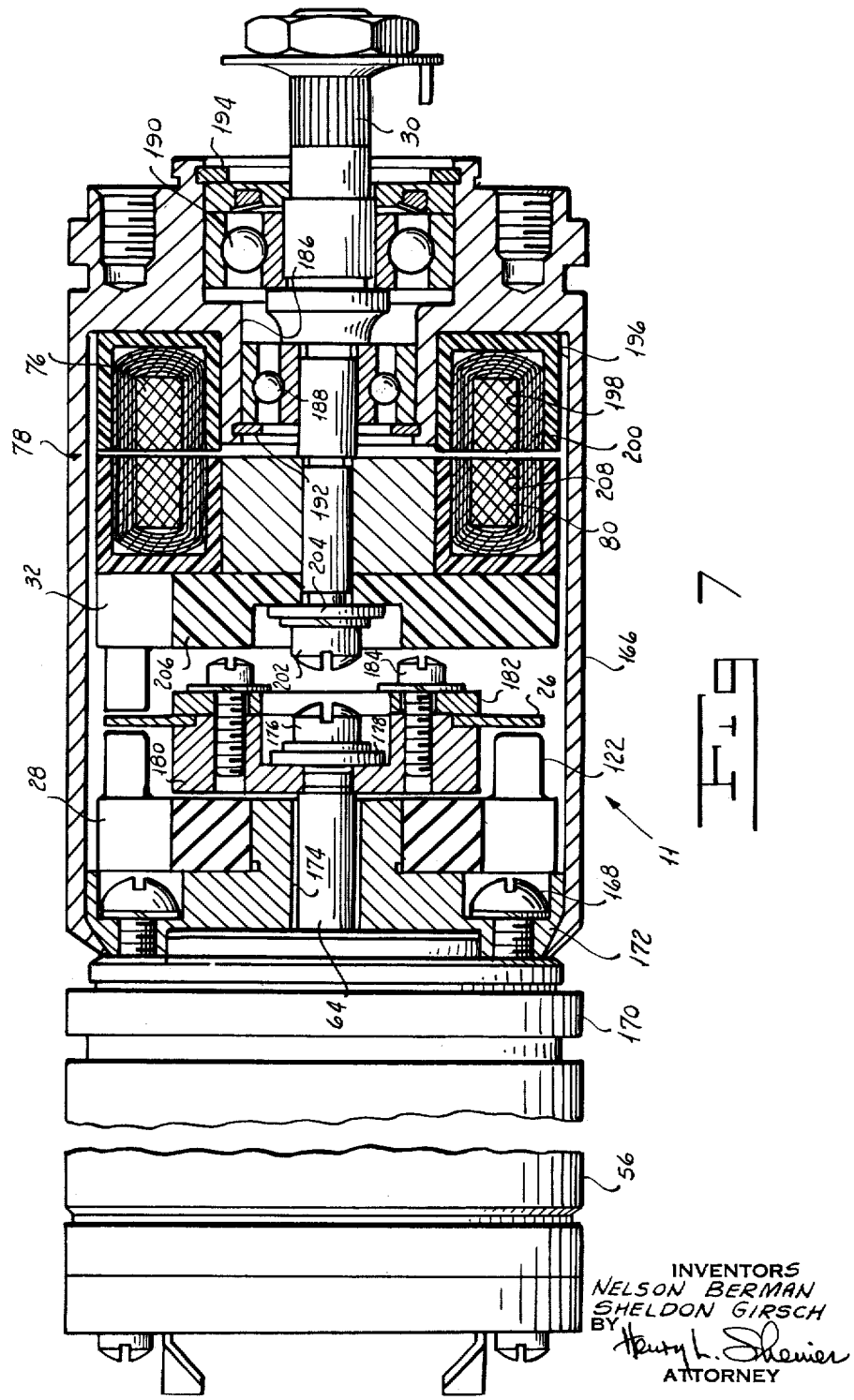

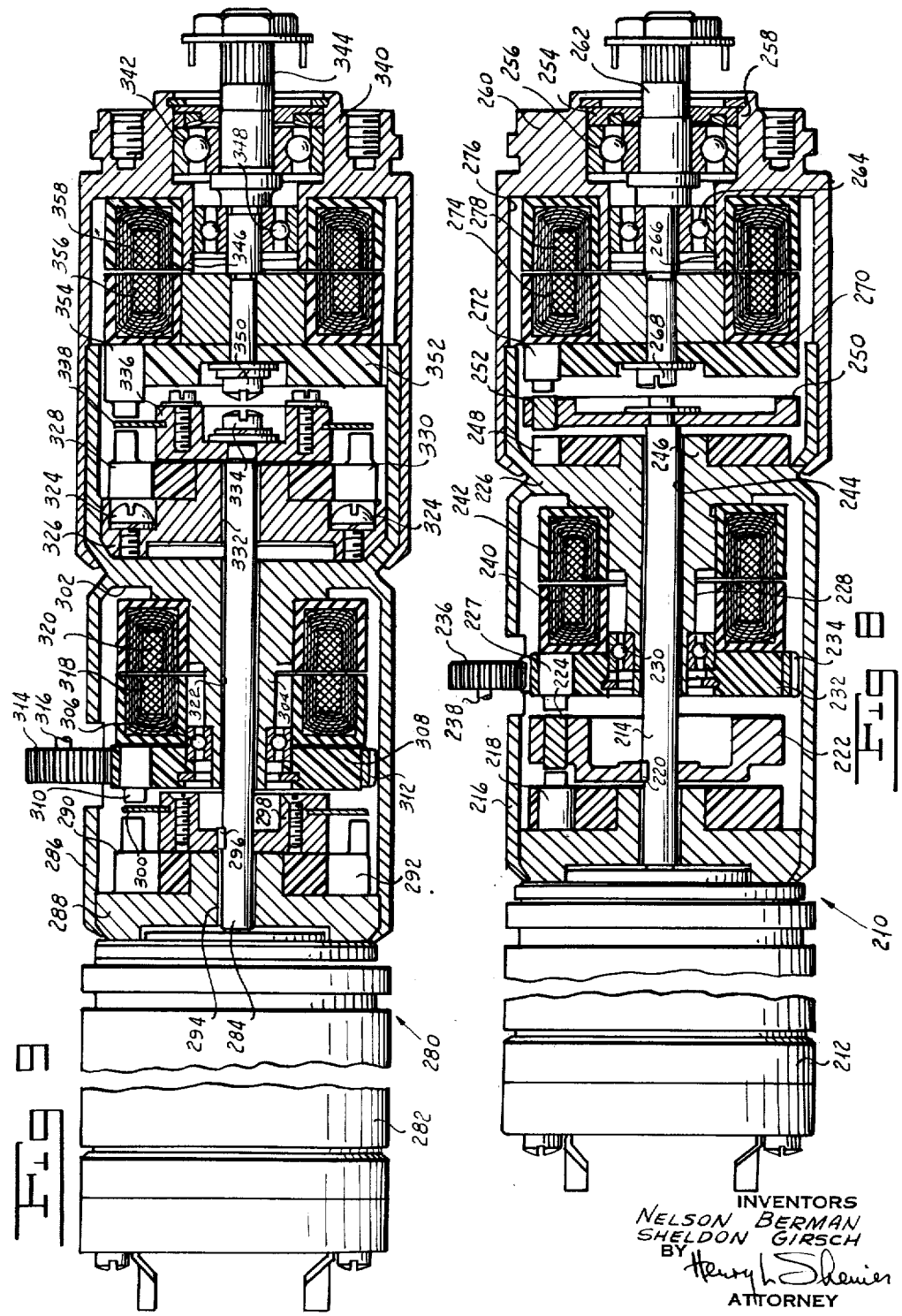

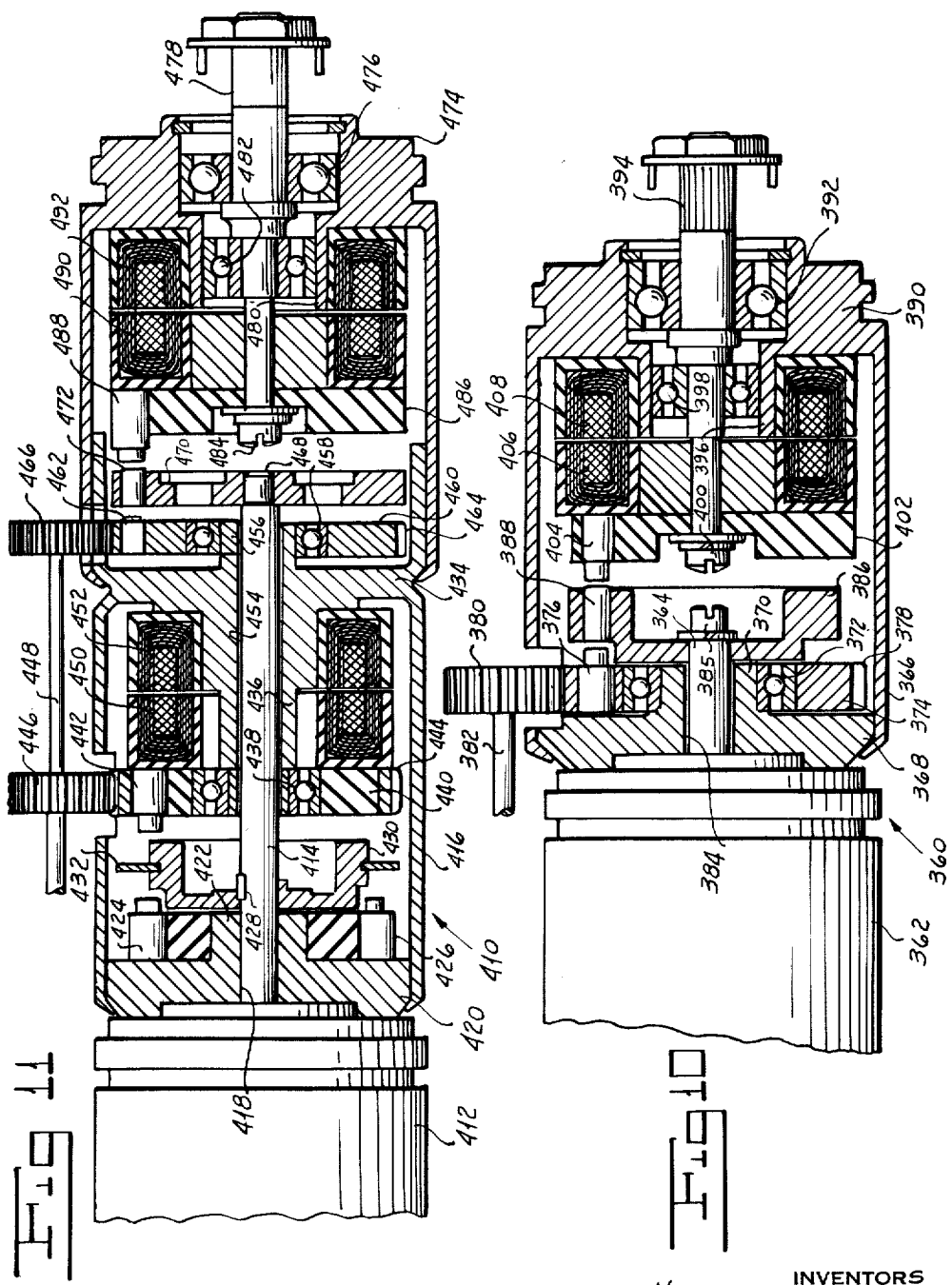

United States Patent Office 3,012,229
Patented Dec. 5, 1961

3,012,229
PULSE SYNCHRONOUS SYSTEM
Nelson Berman, New Hyde Park, and Sheldon Girsch, Long Island City, N.Y., assignors, by mesne assignments, to United Aircraft Corporation, East Hartford, Conn., a corporation of Delaware
Filed Aug. 5, 1957, Ser. No. 676,255
15 Claims. (Cl. 340—172.5)

Our invention relates to a pulse synchronous system and more particularly to a pulse synchronous system in which angular position data is represented by the interval on a time base between electrical impulses.

Synchronous systems are known in the prior art for transmitting angular position data. These systems employ interacting electromagnetic fields to produce an electric signal representing the difference in angular position of a synchronous transmitter rotor shaft and a synchronous receiver rotor shaft. Where the angular position representation is required to be in pulse form as in the case of digital computers some auxiliary means is necessary for converting the electrical signal to pulses.

In these synchronous systems of the prior art slip rings and brushes are necessary for removing the output signal from the receiver rotor. Further, slip rings and brushes also are necessary for applying line voltage to the synchronous transmitter. The slip ring and brush construction adds to the torque necessary to drive the transmitter and receiver rotors. Then, too, the brushes require frequent adjustment and replacement after a period of time. With these synchronous systems of the prior art, if multiple systems are required, an independent motor must be used for each transmitter unit and for each receiver unit.

We have invented a pulse synchronous system which produces an output representation which may be used directly in devices such as digital computers requiring pulse inputs. Our system employs no slip rings and brushes with the result that it is more reliable than systems of the prior art. Further, less torque is required to drive the motors of our system since friction owing to brushes and slip rings has been eliminated. A single motor may be employed to drive a number of transmitters or a number of receivers. Our system transmits the complement of angular position as well as the angular position itself. Many remote receivers may be driven from a single transmitter without excessive loading of the transmitter.

One object of our invention is to provide a pulse synchronous system which represents angular position data by the spacing on a time base between electrical impulses.

Another object of our invention is to provide a pulse synchronous system which produces a pulse output which may be fed directly to a digital computer.

Yet another object of our invention is to provide a pulse synchronous system which employs no slip rings and brushes.

A further object of our invention is to provide a pulse synchronous system which requires less driving torque than synchronous systems of the prior art.

A still further object of our invention is to provide a pulse synchronous system in which a single motor may be used to drive a number of transmitters or receivers.

Other and further objects of our invention will appear from the following description:

In general our invention contemplates the provision of a pulse synchronous system including a transmitter which generates two pulses during each revolution of a synchronous motor. The time interval between these pulses is directly proportional to the angular position of a transmitter data input shaft. The system includes a receiver which also generates two pulses, the time interval between which is directly proportional to the angular position of the receiver data output shaft. The system is arranged to compare the time interval of the transmitter pulses with the time interval of the receiver pulses to produce a pair of pulses, the time interval between which is directly proportional to the difference in angular position between the transmitter and receiver data shafts. We may provide a means actuated by these pulses for positioning the receiver data shaft synchronously with the transmitter data shaft.

In the accompanying drawings which form part of the instant specification and which are to be read in conjunction therewith and in which like reference numerals are used to indicate like parts in the various views:

FIGURE 1 is a diagrammatic representation of our pulse synchronous system in one condition of operation.

FIGURE 2 is a representation of the relationship between transmitter and receiver pulses of our system in the condition shown in FIGURE 1.

FIGURE 3 is a diagrammatic view of our pulse synchronous system in a different condition of operation from that shown in FIGURE 1.

FIGURE 4 is a representation of the relationship between the transmitter and receiver pulses of our system shown in FIGURE 3.

FIGURE 5 is a schematic view of our pulse synchronous system showing details of one embodiment of the means for driving the receiver data shaft.

FIGURE 6 is a sectional view of one embodiment of a transmitter of our pulse synchronous system.

FIGURE 7 is a sectional view of one embodiment of a receiver of our pulse synchronous system.

FIGURE 8 is a sectional view of a dual transmitter which may be employed in our pulse synchronous system.

FIGURE 9 is a sectional view of a dual receiver of our pulse synchronous system.

FIGURE 10 is a sectional view of a differential transmitter of our pulse synchronous system.

FIGURE 11 is a sectional view of a differential receiver-transmitter of our pulse synchronous system.

Figure 12:
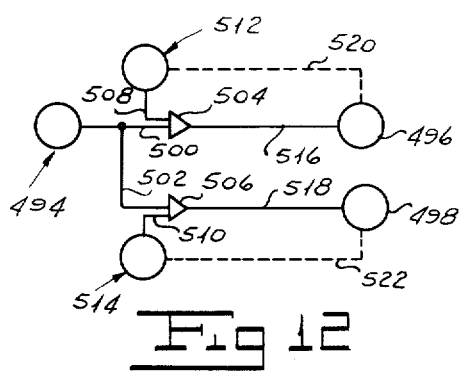
FIGURE 12 is a schematic view of a system including a pair of remote servomotors driven by a single transmitter of our pulse synchronous system.

More particularly referring now to FIGURES 1 and 2 of the drawings, our system includes a transmitter indicated generally by the reference character 10 and a receiver indicated generally by the reference character 11. Transmitter 10 includes means to be described in detail hereinafter for continuously rotating a permanent magnet 12 in the direction of the arrow "$a$." Transmitter 10 also includes a stationary reference magnetic pickup 14. A shaft 16 carries for rotation with it a transmitter data magnetic pickup 18. As will be described more fully hereinafter, shaft 16 is arranged to position pickup 18 about the axis of rotation of magnet 12. As is the case with synchronous systems of the prior art, the shaft 16 is positioned by the device (not shown) or the like, the movement of which it is desired to reproduce at the receiver end of the system.

Each time the magnet 12 passes pickup 14 an electrical impulse Tr is induced in the pickup. Similarly, each time magnet 12 passes the data pickup 18, an electrical impulse Td is generated in pickup 18. A channel 20 conducts the transmitter reference pulse Tr to a motor control circuit, indicated generally by the reference character 22. A channel 24 conducts the transmitter data pulse Td produced in pickup 18 to receiver 11.

Receiver 11 includes a drum or disk 26 of magnetizable material continuously rotated by means to be described hereinafter in the direction of the arrow "b" in FIGURE 1. Receiver 11 also includes a receiver reference pickup 28 stationarily positioned with respect to disk 26. A receiver data shaft 30 carries the receiver data recorder 32 for rotation with it. As will be explained hereinafter, shaft 30 is arranged to position pickup 32 about the axis of rotation of disk 26. Channel 24 conducts a transmitter data pulse Td to the receiver recorder 32 which records the pulse on disk 26 as a receiver data pulse Rd. As disk 26 rotates in the direction of the arrow "b," the magnetized area on disk 26 representing the receiver data pulse produces receiver reference pulses Rr in pickup 28. An electrical channel 34 conducts these pulses to circuit 22 as will be explained more fully hereinafter. Conductors 36 and 38 feed the output signal from circuit 22 to a servomotor 40 to energize the motor to drive shaft 30 in a direction to rotate receiver recorder 32 in a direction toward the synchronous position which corresponds to the position of data pickup 18.

In the position of the elements shown in FIGURE 1, data pickup 18 is displaced approximately 45° in a clockwise direction from reference pickup 14. Receiver recorder 32 is displaced approximately 135° in a clockwise direction from receiver reference pickup 28. Thus the difference in relative angular positions of the pickup 18 and recorder 32 is 90°. Our system produces a pair of pulses spaced along a time axis by a distance equal to the difference in angular position between pickup 18 and recorder 32. For purposes of convenience, assume that magnet 12 starts from rest and passes under the pickup 14 to produce a pulse Tr1 in head 14. As magnet 12 continues to rotate in the direction of the arrow "a," it produces a pulse Td1, in data pickup 18. As can be seen by reference to FIGURE 2, the spacing along a time axis between the pulses Tr1 and Td1 on a time base is proportional to 45° of rotation of magnet 12. Channel 24 conducts pulse Td1 to recorder 32 which records this pulse on disk 26 as a receiver data pulse Rd1. On a time base, the origin of which is determined by the instant when pulse Tr1 is produced in pickup 14, pulse Rd1 appears in the same position as does pulse Td1. As disk 26 rotates in the direction of the arrow "b" the magnetized portion of disk 26 produces a pulse Rr1 in pickup 28. Owing to the relative angular position of recorder 32 with respect to pickup 28, pulse Rr1 is produced in pickup 28 after 225° of rotation of disk 26 from the time when pulse Rd1 was recorded on the disk since we so arrange our system that magnet 12 and disk 26 rotate at the same synchronous speed. Owing to this fact pulse Rr1 is positioned on the time base shown in FIGURE 2 at a time proportional to 225° after the occurrence of pulses Td1 and Rd1. By this time magnet 12 has reached 270° of rotation from the position of pickup 14. After 90° more rotation of the magnet 12 and disk 26, the next transmitter reference pulse Tr2 is produced. From the foregoing it will be seen that pulse Rr1 is fed to circuit 22 and a pulse Tr2 is fed to the circuit the equivalent of 90° later in time. Thus the spacing on a time axis between pulses Rr1 and Tr2 which make up a pair of pulses in our system, is directly proportional to the difference in angular position between data pickup 18 and recorder 32. It will be seen, in the example given, that if recorder 32 and pickup 18 do not change position, a pulse Rr2 is fed to circuit 22, 270° after pulse Tr2, and a pulse Tr3 occurs 90° after pulse Rr2. It will be understood that in continuous operation of our system no distinction is made between the various transmitter pulses. Neither is any distinction made between the respective receiver pulses. If conditions remain the same, pairs of pulses are produced, each pair of which includes a receiver and a transmitter pulse and the spacing between the pairs is directly proportional to the difference in angular position between shaft 16 and shaft 30. The pairs of pulses representing the difference in angular position between shaft 16 and shaft 30 can be picked off the channels 30 and 34 and may be fed to any suitable device such as a computer (not shown) or the like. In the system shown, these pulses are fed to the motor control circuit 22.

From an examination of FIGURE 1, it will be apparent that in order to position recorder 32 in the synchronous position it must be in a counterclockwise direction through 90° of rotation. If this is done the transmitter and receiver pulses of a pair occur simultaneously. Thus it will be seen that if the receiver pulse of a pair of pulses precedes the transmitter pulse in time, motor 40 must be driven to move recorder 32 in a counterclockwise direction to arrive at the synchronous position.

In the condition of the apparatus shown in FIGURE 3, data pickup 18 occupies an angular position of 135° with respect to the reference pickup 14. Thus the pulses Td1 and Rd1 occur on a time base as shown in FIGURE 4 at a time equivalent to 135° of rotation of magnet 12 and disk 26 after pulse Tr1. The receiver recorder 32 is positioned at an angle of approximately 45° with respect to the receiver reference pickup 28. Thus the difference between the angular positions of pickup 18 and recorder 32 is 90°. Disk 26 must rotate through an angle of 315° after pulse Rd1 is recorded before the pulse Rr1 is produced in pickup 28. As can be seen by reference to FIGURE 4, in this condition of our system the pulse Tr2 occurs 90° in time before pulse Rr1 occurs. In order to bring receiver 32 to the synchronous position, it must be rotated through an angle of 90° in a clockwise direction as viewed in the figure.

From the foregoing it will be seen that if the receiver recorder 32 occurs first or leads the transmitter data pickup 18, the receiver pulse precedes the transmitter pulse in time and the receiver recorder must be driven in one direction toward synchronous position. It will be apparent that each time the receiver recorder 32 is driven through synchronous position, the order of pulses is reversed. Consequently, if the direction of drive of motor 40 is reversed each time two transmitter or two receiver pulses occur sequentially, recorder 32 will always be driven toward the synchronous position. We have arranged circuit 22 to reverse the direction of drive of motor 40 each time two transmitter or two receiver pulses occur sequentially in time. It is to be understood, as will be explained hereinafter, that receiver 11 includes an erase head for removing the receiver data pulses after they have produced receiver reference pulses in pickup 28.

Referring now to FIGURE 5, transmitter 10 includes a synchronous motor 42 which may conveniently be a three-phase motor connected by respective conductors 44, 26, and 48 to a source of three-phase electrical energy 50. Motor 42 has an output shaft 52 which carries for rotation with it by any convenient means a magnet mounting member 54.

The receiver 11 includes a synchronous motor 56 connected by respective conductors 58, 60, and 62 to the source 50. Motor 56 drives an output shaft 64 which carries for rotation with it by any convenient means disk 26. We so select motors 42 and 56 that they rotate at substantially the same synchronous speed when energized from the same source 50 as shown in FIGURE 5. Thus both magnet 12 and disk 26 rotate at the same speed.

The channel indicated by reference character 24 in FIGURES 1 and 3 for conducting transmitter data pulses to the receiver recorder 32 includes a first rotary inductive coupling, indicated generally by the reference character 66. One winding 68 of this coupling is fed by pickup 18. The other winding 70 is connected by respective conductors 72 and 74 to a winding 76 of a second rotary inductive coupling, indicated generally by the reference character 78. The other winding 80 of coupling 78 feeds the receiver recorder 32.

The channel, indicated by reference character 20 in FIGURES 1 and 3, for conducting transmitter reference pulses to the circuit 22, has respective conductors 82 and 84 which connect pickup 14 to a transmitter relay winding T. Similarly the channel indicated by reference character 34 in FIGURES 1 and 3 for conducting the receiver reference pulse to circuit 22, includes respective conductors 86 and 88 which connect pickup 28 to a receiver pulse relay winding R.

A pair of conductors 90 and 92 in control circuit 22 are connected to the respective terminals 94 and 96 of a suitable source of electrical potential. Motor 40 has an armature 98 and a pair of field windings 100 and 102 adapted to be connected selectively across conductors 90 and 92 by a switch arm 104 which in one position engages a contact 106 connected to winding 100 and in the other position engages a contact 108 connected to winding 102. We connect a relay winding "a," a normally open switch T1 associated with winding T, and a normally closed switch R1 associated with winding R in series between conductors 90 and 92. A transmitter pulse energizes winding T momentarily to close switch T1 through a linkage 110 to complete the circuit of winding "a" to energize the winding and close normally open switches $a1$ and $a2$ through a linkage 112. Switch $a1$ is connected across switch T1 to provide a holding circuit for winding "a." We connect normally open switch $a2$, a normally open switch T2, and a relay winding "b" in series between conductors 90 and 92. A normally open switch $b1$ connected across switch T2 is operated by a linkage 114 when winding "b" is energized to provide a holding circuit for the winding. We connect a normally closed switch T3 operated by linkage 110 and a normally open switch R2 and a relay winding "c" in series between conductors 90 and 92. Relay winding R when energized by a receiver pulse operates a linkage 116 to open normally closed switch R1 and to close normally open switches R2 and R3. When switches T3 and R2 are closed, winding "c" is energized to close normally open switches $c1$ and $c2$ through a linkage 118. Switch $c1$ is connected across switch R2 to provide a holding circuit for winding "c." We connect a relay winding "d," normally open switch R3, and normally open switch $c2$ in series between conductors 90 and 92. When winding "c" is energized to close switch $c2$, the next receiver pulse which energizes winding R closes R3 to energize "d." When energized, winding "d" operates a linkage 120 to close a normally open switch $d1$ connected across switch R3. This provides a holding circuit for winding "d." Linkage 120 also operates when winding "d" is energized to move arm 104 to engage contact 108 to energize field winding 102 of motor 40 to reverse the direction of rotation of the motor shaft 30.

The operation of our motor reversing circuit can best be understood by assuming a sequence of transmitter and receiver pulses. As has been explained hereinabove, we reverse the direction of rotation of motor 98 each time a pair of transmitter or a pair of receiver pulses occur successively. Let us assume that arm 104 initially engages contact 106. In this condition of arm 106 both windings "c" and "d" are energized. Let us also assume a sequence of pulses Tr1 Rr1, Tr2, Tr3, Rr2. On occurrence of the pulse Tr1 winding T is momentarily energized to close switches T1 and T2 and open switch T3. Closing of switch T1 energizes winding "a" to close switch $a1$ to maintain the circuit of winding "a" after T1 opens when pulse Tr1 dies out. The arrangement of our circuit is such that switch T2, after closing, reopens before winding "a" closes switch $a2$. As a result, winding "b" is not energized on occurrence of pulse Tr1. When switch T3 opens, the holding circuit for winding "c" is broken and switches $c1$ and $c2$ open to de-energize winding "d." The construction of switch arm 104 is such that after having been moved to a position to engage either contact 106 or 108, it remains in engagement with that contact until it is positively moved away from the contact. Consequently, after the occurrence of a pulse Tr1, arm 104 remains in engagement with contact 106 and motor 40 continues to run in one direction on field winding 100.

It will be remembered that pulse Tr1 energized winding "a" which remained energized owing to the action of the holding circuit provided by switch $a1$. When the pulse Rr1 occurs it energizes winding R momentarily to open switch R1 and to close switches R2 and R3. Opening of switch R1 interrupts the holding circuit for winding "a" to de-energize the winding. Closing of switch R2 completes the circuit of winding "c" through switch T3 to energize the winding. Winding "c" closes switch $c1$ to maintain its circuit. The construction of the relay including switch $c2$ is such that switch $c2$ does not close until after switch R3 opens when the pulse Rr1 dies out. As a result, winding "d" is not energized upon the occurrence of pulse Rr1. After pulse Rr1 motor 40 continues to run on field winding 100.

From the sequence of pulses assumed, it will be seen that on occurrence of pulse Tr3 we have two transmitter pulses occurring successively. At this time, in order to drive the data recorder 32 toward the synchronous position, the direction of rotation of motor 40 should reverse. In other words, motor 40 should run on winding 102. It will be remembered that after pulse Tr2 winding "a" remains energized and switches A1 and A2 remain closed. On occurrence of pulse Tr3, switch T2 again closes and the circuit of winding "b" is completed through switch $a2$. When energized, winding "b" operates linkage 114 to complete its own holding circuit through switch $b1$. At the same time linkage 114 moves arm 104 out of engagement with contact 106 and into engagement with contact 108 to reverse the direction of drive of motor 40.

When pulse Rr2 occurs, it interrupts the circuit of winding "a" by opening switch R1. As a result of this operation, the holding circuit for winding "b" is opened by reason of the opening of switch $a2$ and winding "b" is de-energized. Arm 104, however, remains in engagement with contact 108 and the direction of rotation of motor 40 is not reversed. From the foregoing it will be seen that our control circuit reverses the direction of rotation of motor 40 each time two transmitter or two receiver pulses occur successively. As has been explained hereinabove, this action ensures that the receiver recorder 32 is always being driven toward synchronous position.

From the description thus far, it will be apparent that the specific circuitry shown in FIGURE 5 is applicable to both FIGURES 1 and 3 which are simplified diagrammatic views of our system in two conditions of operation. The relationship between FIGURES 1 and 3 and FIGURE 5 has been clearly pointed out hereinabove. The channels 20, 24, and 34 of FIGURES 1 and 3 correspond respectively to the pairs of conductors 82 and 84, 72 and 74, and 86 and 88.

We provide our system with an erasing head 122 for removing the pulse recorded on disk 26 by recorder 32. We arrange our control circuit to energize the erase head 122 on alternate transmitter reference pulses and to de-energize the erase head on the other transmitter reference pulses. Since a transmitter pulse occurs once during each revolution of the synchronous motor 42, the receiver disk 26 is erased during alternate revolutions of the disk. We connect erase head 122 in series with a normally open switch $f3$ between conductors 90 and 92. We connect a relay winding "e" in series with a normally open switch T4 operated by linkage 110 between conductors 90 and 92. On occurrence of a pulse T$r$1 switch T4 closes to energize winding "$e$" to close a normally open switch $e$1 by means of a linkage 124. Switch $e$1 is connected in series with a normally closed switch $f$1 across switch T4 to provide a holding circuit for winding "$e$." We connect a normally open switch $e$2, a normally open switch T5, and a relay winding "$f$" in series between conductors 90 and 92. Linkage 124 closes switch $e$2 after switch T5 opens when pulse T$r$1 dies out. As a result, after the occurrence of pulse T$r$1, winding "$e$" is energized and remains energized but winding "$f$" is not energized. Upon the occurrence of the next transmitter reference pulse T$r$2, switch T5 closes to complete the circuit of winding "$f$" through switch $e$2. Winding "$f$" when energized opens the holding circuit of winding "$e$" by opening switch $f$1 through a linkage 126. When this holding circuit is opened winding "$e$" is de-energized to open switch $e$2 and permit switch $e$3 to close. Energization of winding "$f$" also closes a switch $f$2 through linkage 126 to complete the holding circuit for winding "$f$" through switch $e$3. The arrangement of our relays "$e$" and "$f$" is such that when switch $f$1 opens to de-energize winding "$e$," switch $e$3 immediately closes. Switch $e$2 does not, however, open immediately, but remains closed until switch $f$2 closes to complete the holding circuit for winding "$f$." Energization of winding "$f$" also closes switch $f$3 to energize head 122. Upon the occurrence of pulse T$r$3, winding "$e$" is again energized to open switch $e$3 to de-energize winding "$f$." The holding circuit for winding "$e$" is completed through switch $e$1 and switch $f$1 which is permitted to close when winding "$f$" is de-energized. From the foregoing it will be seen that erase head 122 is energized during alternate revolutions of disk 26.

Referring now to FIGURE 6, which shows the construction of the transmitter 10 of our system, the unit includes housing 128 secured by any convenient means such as bolts 130 to the casing or shell of the transmitter drive synchronous motor 42. Bolts 130 pass through an end member 132 which carries the housing 128. Member 132 supports the transmitter reference head 14. We form member 132 with a bore 134 through which the shaft 52 of motor 42 passes. Any convenient means such as a screw 136 and washers 138 fix the magnet supporting member 54 on shaft 52 for rotation with it. As can be seen by reference to FIGURE 6, the magnet 12 is carried by the member 54 adjacent its periphery. As has been explained hereinabove, when shaft 52 rotates, it drives member 54 to move magnet 12 past pickup 14 to induce a pulse therein. The end of housing 128 remote from member 132 is formed with a counterbore 140 in which we mount respective bearings 142 and 144. Respective rings 146 and 148 retain the bearings in position in counterbore 140. We form housing 128 with an annular recess 150 in which we mount the portion of coupling 66 including winding 70. Conveniently, winding 70 is placed in an annular recess 152 formed in a slit, toroidally wound, iron wire core 154 potted in a suitable thermosetting or thermoplastic resin.

Bearing 142 and 144 rotatably support the transmitter data shaft 16. A bolt or the like 156 and washers 158 retain a data pickup support member 160 on shaft 16 for rotation with the shaft. Member 160 carries the data pickup 18 adjacent its periphery so that as magnet 12 passes by the pickup it induces an electrical impulse therein. Shaft 16 also carries for rotation with it by any convenient means the portion of coupling 66 including winding 68. This winding 68, like winding 70, is disposed in an annular recess 162 formed in a slit, toroidally wound, iron wire core 164 potted in a suitable plastic.

Referring now to FIGURE 7 which shows the construction of a receiver unit 11 of our system, the unit includes a housing 166 fixed by any convenient means such as bolts 168 to the shell or casing 170 of motor 56. Bolts 168 pass through an end member 172 of housing 166. Member 172 supports the receiver reference pickup 28 and the erase head 122. Shaft 64 of motor 56 passes through a bore 174 in member 172. A bolt or screw 176 and a washer 178 fix a disk support 180 on shaft 64 for rotation with it. A retaining ring 182 secured to support 180 by bolt 184 secures disk 26 to support 180 for rotation with it.

We form the end of housing 166 remote from member 172 with a counterbore 186 for receiving respective bearings 188 and 190 retained in counterbore 186 by rings 192 and 194. An annular recess 196 in housing 166 carries the portion of coupling 78 including winding 76. Winding 76 is disposed in an annular recess 198 formed in a slit, toroidally wound iron wire core 200 potted in a suitable plastic.

Bearings 188 and 190 rotatably support the receiver recorder drive shaft 30 which, as is explained hereinabove, may conveniently be the output shaft of a two-phase motor, such as the motor 98. A bolt or screw 202 and a washer 204 retain the receiver recorder support 206 on shaft 30 for rotation with it. Support 206 carries the receiver recorder 32 adjacent its periphery in a position to record pulses fed to the recorder on disk 26. Shaft 30 also carries for rotation with it the portion of coupling 78 including winding 80. Conveniently, winding 80 is disposed in an annular recess 208 formed in a toroidally wound, iron wire core potted in a suitable plastic.

Referring now to FIGURE 8, we have shown a dual form of our pulse synchronous transmitter indicated generally by the reference character 210. Transmitter 210 includes a single synchronous motor 212 having a drive shaft 214. A housing 216 secured by any convenient means to the casing of motor 212 supports the reference pickup 218 of the first unit of the dual transmitter 210. A key 220 secures a support 222 on shaft 214 for rotation with it. Support 222 carries adjacent its periphery a permanent magnet 224. As shaft 214 rotates, it moves magnet 224 past the pickup 218 to induce an electrical impulse therein. This impulse, it will be understood, is the reference pulse of the first unit of our dual transmitter 210.

We form housing 216 with a partition 226 which separates the first and second units of our dual transmitter. Partition 226 is formed with a cylindrical support 228 extending into the portion of housing 216 enclosing the first unit. A bearing 230 carried by support 228 rotatably carries a data pickup support 232. Support 232 carries adjacent its periphery a data pickup 227. We form the periphery of member 232 with teeth 234 adapted to be engaged by a pinion 236 carried by a first data input shaft 238 for rotation with it. It will be understood that shaft 238 is the data input shaft for the first unit of our dual transmitter 210. Bearing 230 also rotatably supports the primary winding 240 of the rotary inductive coupling of the first unit. Consequently, we secure winding 240 to member 232 by any suitable means for rotation with it. We mount the second winding 242 of the first unit rotary inductive coupling on support 228 adjacent the winding 240. The first unit of our dual transmitter 210 is similar to the transmitter described in connection with FIGURE 6 with the exception that the data input is through pinion 236 rather than directly through a shaft such as the shaft 30. As magnet 224 passes by pickup 227, it induces the first unit data pulse therein.

We form support 228 with a bore 244 through which shaft 214 extends. An annular boss 246 formed on partition 226 supports the reference pickup 248 of the second unit of our dual transmitter 210. An end of shaft 214, extending to the right of boss 246 as viewed in FIGURE 8 carries for rotation with it a support 250. We mount a permanent magnet 252 adjacent the periphery of support 250. As shaft 214 rotates, it drives magnet 252 past pickup 248 to induce the second unit reference pulse in pickup 248.

A retaining ring 254 holds a bearing 256 in a bore 258 formed in the end 260 of housing 216 remote from motor 212. Bearing 256 rotatably carries the data input shaft 262 of the second unit of our dual transmitter 210. A second bearing 264 disposed in the interior of an annular boss 266 formed on end 260 also supports shaft 262. A bolt or the like 268 secures a data pickup support 270 on shaft 262 for rotation with it. We mount the second unit data pickup 272 adjacent the periphery of support 270. Bolt 268 also retains the primary winding 274 of the rotary inductive coupling of the second unit on shaft 262 for rotation with it. An annular recess 276 formed by housing 216 and boss 266 houses the secondary winding 278 of the second unit rotary inductive coupling. It will be appreciated that this second unit of our dual transmitter 210 is similar to the transmitter described in connection with FIGURE 6. It does not, however, require an independent synchronous motor but may be driven from the motor 212. In other words, our dual transmitter requires only a single motor for both units. It does not require two synchronous motors for a dual unit as would be required for dual units of the synchronous systems of the prior art.

Referring now to FIGURE 9, we have shown a dual form of our pulse synchronous receiver, indicated generally by the reference character 280, each unit of which is similar to the receiver described in connection with FIGURE 7. Receiver 280 includes a synchronous motor 282 having an output shaft 284. We secure a housing 286 to the casing of motor 282 by any convenient means. An end 288 of housing 286 stationarily supports the first unit reference pickup 290, and an erase head 292. Shaft 284 extends through a bore 294 formed in end 288. A key 296 secures a disk support 298 to shaft 284 for rotation with it. Member 298 supports the recording disk 300 of the first unit of our dual receiver 280. We form housing 286 with a partition 302 which separates the first and second receiver units. A boss 304 extending into the first unit from partition 302 supports a bearing 306 which rotatably carries a data recorder support 308. We mount the first unit data recorder 310 adjacent the periphery of member 308. We form the periphery of member 308 with teeth 312 adapted to be engaged by a pinion 314 carried by the first unit data input shaft 316 for rotation with it. Bearing 306 also rotatably supports the primary winding 318 of the rotary inductive coupling of the first unit. Conveniently, we secure winding 318 to member 308 by any appropriate means. We mount the secondary winding 320 of the first unit rotary inductive coupling on boss 304 adjacent winding 318. This first unit of our dual receiver is similar to the receiver described in connection with FIGURE 7 with the exception that the data input is afforded by pinion 314 rather than directly by a shaft such as the shaft 30.

We form boss 304 with a bore 322 through which shaft 284 extends. Bolts or the like 324 secure the second unit reference pickup support 326 to partition 302. Support 326 carries the second unit reference pickup 328 as well as the second unit erase head 330. Shaft 284 extends through a bore 332 formed in support 326. A bolt 334 secures the second unit recording disk support 336 to shaft 284 for rotation with it. We mount the second unit recording disk 338 on member 336. The end 340 of housing 286 remote from end 288 carries a bearing 342 which rotatably supports the second unit data input shaft 344. An annular boss 346 formed on end 340 carries a second bearing 348 which also supports shaft 344. A bolt or the like 350 secures the second unit data recorder support 352 to shaft 344 for rotation with it. We mount the second unit data recorder 354 on member 352. Bolt 350 also retains the primary winding 356 of the rotary inductive coupling of the second unit on shaft 344 for rotation with it. We mount the secondary winding 358 of the rotary inductive coupling of the second unit on boss 346. It will be understood that this second unit of the dual receiver is similar to the receiver discussed in connection with FIGURE 7, with the exception that it does not require a synchronous motor independent of the first unit motor 282. This is a distinct advantage over dual receivers of the type known in the prior art in which independent synchronous motors are required for each unit.

Referring now to FIGURE 10, we have shown a differential synchronous transmitter, indicated generally by the reference character 360 which may be used in our pulse synchronous systems. Transmitter 360 includes a synchronous motor 362 having an output shaft 364. We secure a housing 366 to the casing of motor 362 by any convenient means. One end 368 of housing 366 is formed with an annular boss 370 which carries a bearing 372 which rotatably supports the reference pickup support 374. We mount the reference pickup 376 adjacent the periphery of support 374. We form the periphery of support 374 with teeth 378 adapted to be engaged by a pinion 380 carried by an input shaft 382 for rotation with it. Shaft 364 extends through a bore 384 in the end 368 and boss 370. A bolt 385 secures a magnet support 386 on shaft 364 for rotation with it. We mount the transmitter permanent magnet 388 adjacent the periphery of member 386. The end 390 of housing 366 remote from end 368 carries a bearing 392 which rotatably supports a data input shaft 394. An annular boss 396 formed on end 390 carries a second bearing 398 which also supports shaft 394. A bolt or the like 400 secures a data pickup support 402 on shaft 394 for rotation with it. We mount the data pickup 404 adjacent the periphery of support 402. Bolt 400 also retains the primary winding 406 of the transmitter rotary inductive coupling on shaft 394 for rotation with it. We mount the secondary winding 408 of the rotary inductive coupling on boss 396. It will be seen that this differential transmitter includes both a movable reference pickup and a movable data pickup. With this construction the interval on a time base between the reference and data pulses put out by this transmitter is proportional to the difference in relative angular positions of the reference pickup 376 and the data pickup 404.

Referring now to FIGURE 11, we have shown a differential receiver transmitter indicated generally by the reference character 410 which may be employed in certain pulse synchronous systems. The receiver transmitter 410 includes a synchronous motor 412 having an output shaft 414. We fix a housing 416 to the casing of motor 412 by any convenient means. Shaft 414 extends through a bore 418 in an end 420 of housing 416. We form end 420 with an annular support 422 which carries the receiver unit reference pickup 424 and the receiver unit erase head 426. A key or the like 428 secures the receiver unit recording disk support 430 on shaft 414 for rotation with it. We mount a recording disk 432 on member 430. We form housing 416 with a partition 434 having an annular support boss 436. Boss 436 carries bearing 438 which rotatably carries the receiver unit recorder support 440. We mount the receiver recorder 442 adjacent the periphery of member 440. We form the periphery of member 440 with teeth 444 to be engaged by a pinion 446 carried by a shaft 448 for rotation with the shaft. Bearing 438 also supports the primary winding 450 of the rotary inductive coupling associated with the receiver unit. We mount the secondary winding 452 of the receiver unit rotary inductive coupling on the boss 436 adjacent winding 450.

Shaft 414 extends through a bore 454 in partition 434 and through an annular support 456 formed on partition 434. Boss 456 carries a bearing 458 which rotatably carries the transmitter reference pickup support 460. We mount the transmitter unit reference pickup 462 adjacent the periphery of support 460. We form the periphery of support 460 with teeth 464 adapted to be engaged by a pinion 466. In the form of our receiver transmitter shown, pinion 466 is mounted on shaft 448 for rotation therewith. It will be understood that we may, if desired, provide a separate shaft for pinion 466. A bolt or the like 468 secures a permanent magnet support 470 on shaft 414 for rotation with it. We mount the transmitter unit permanent magnet 472 adjacent the periphery of support 470.

The end 474 of housing 416 remote from end 420 carries a bearing 476 which rotatably supports the data input shaft 478 of the transmitter unit. An annular boss 480 formed on end 474 carries a second bearing 482 which also supports shaft 478. A bolt or the like 484 secures the data pickup support 486 of the transmitter unit on shaft 478 for rotation with it. We fix the data pickup 488 of the transmitter unit adjacent the periphery of support 486. Bolt 484 also retains the primary winding 490 of the rotary inductive coupling of the transmitter on shaft 478 for rotation with it. We mount the secondary winding 492 of the transmitter unit rotary inductive coupling on boss 480. It is to be noted in connection with this receiver transmitter that a single synchronous motor drives both the receiver unit and the differential transmitter unit.

Referring now to FIGURES 12 to 17, we have shown various applications of the transmitters and receivers of our pulse synchronous system. In FIGURE 12 we have shown a system in which a single pulse transmitter, indicated generally by the reference character 494 feeds a pair of remote servomotors 496 and 498. Respective channels 500 and 502 connect the output of transmitter 494 to respective amplifiers 504 and 506 including appropriate control circuitry of the type described hereinabove. Respective channels 508 and 510 connect the outputs of respective receivers indicated generally by the reference characters 512 and 514 to amplifiers 504 and 506. Respective channels 516 and 518 connect the outputs from amplifiers 504 and 506 to servomotors 496 and 498. Servomotors 496 and 498 drive the respective receivers through linkages 520 and 522. The operation of this system will be understood from the explanation of the single system given in connection with FIGURE 5. The advantage of this system over those known in the prior art is that the loading of a single transmitter with a pair of receivers in our pulse synchronous system does not degrade the system's accuracy as in prior art synchronous systems.

Figure 13:
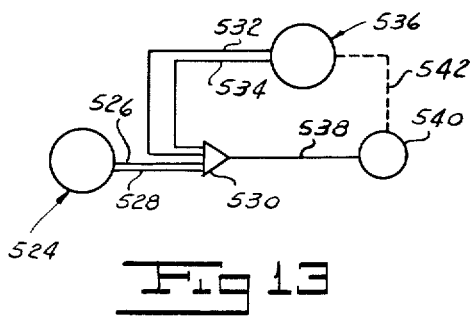
FIGURE 13 is a schematic view of a two-speed system including a dual transmitter and a dual receiver of our pulse synchronous system.

Referring now to FIGURE 13, the unit outputs of a dual transmitter, indicated generally by the reference character 524 are fed by respective channels 526 and 528 to an amplifier and control circuit 530. Respective channels 532 and 534 connect the respective receiver units of a dual receiver indicated generally by the reference character 536 to the amplifier and control circuit 530. It is to be understood that the dual receiver 536 is associated with the dual transmitter 524. A channel 538 feeds the output from the circuit 530 to a servomotor 540 which drives the receiver through a linkage 542. This provides a two-speed system which includes a lesser number of components than are required in systems of the prior art.

Figure 14:
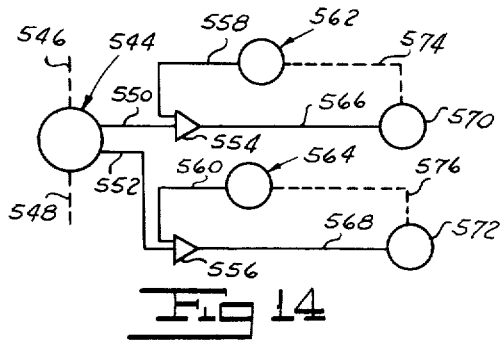
FIGURE 14 is a schematic view of a system including two independent receiver systems driven from a single dual transmitter.

Referring now to FIGURE 14, a dual transmitter indicated generally by the reference character 544, includes independent input shafts 546 and 548. Respective channels 550 and 552 impress the respective outputs from the units of the dual transmitter 544 on amplifier circuits 554 and 556. Respective channels 558 and 560 connect the outputs of respective receivers 562 and 564 to the circuits 554 and 556. Respective channels 566 and 568 feed the outputs of circuits 554 and 556 to servomotors 570 and 572 which drive the respective receivers 562 and 564 through linkages 574 and 576. It will be seen that this system provides two independent servo loops while requiring less components than are necessary in systems of the prior art.

Figure 15:
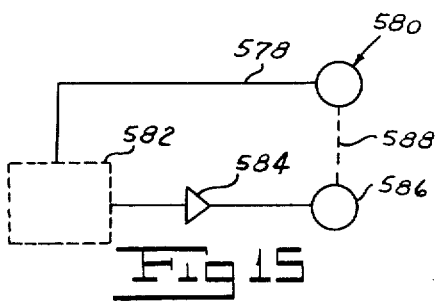
FIGURE 15 is a schematic view of a system including our pulse synchronous transmitter for feeding a computer requiring a digital input.

Referring now to FIGURE 15, a channel 578 feeds the output of a transmitter indicated generally by the reference character 580 to a computer 582, the output of which is fed by an amplifier circuit 584 to a servomotor 586 which drives the transmitter 580 through a linkage 588. This system indicates the manner in which the transmitter output may be fed directly to a computer.

Figure 16:
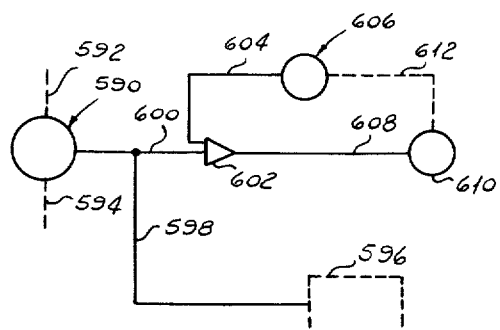
FIGURE 16 is a schematic view of our differential pulse synchronous transmitter for driving a remote servomotor.

The system shown in FIGURE 16 includes a differential transmitter indicated generally by the reference character 590 which includes respective data input shafts 592 and 594. The output of the dual transmitter is fed directly to a computer 596 by a channel 598 and fed through a channel 600 to an amplifier circuit 602. A channel 604 feeds the output of a synchronous receiver indicated generally by the reference character 606 to the amplifier circuit 602. It will be understood that the receiver 606 is associated with the differential transmitter 590. A channel 608 feeds the amplifier circuit output, comprising both the transmitter and computer outputs, to a servomotor 610 which drives the receiver recorder through a linkage 612. As is the case with other of our systems, this arrangement is simpler than a similar arrangement employing synchronous transmitters and receivers of the type known in the prior art.

Figure 17:
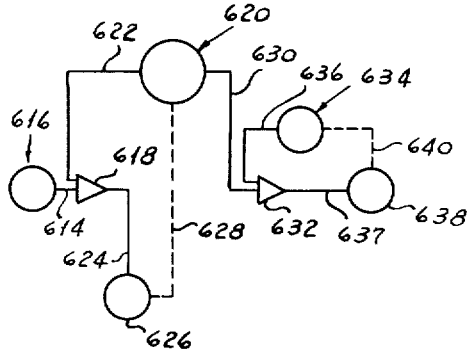
FIGURE 17 is a schematic view of a system in which our pulse synchronous transmitter is used in connection with our differential synchronous transmitter to drive a remote servomotor.

Referring now to FIGURE 17, a channel 614 feeds the output signal from a transmitter indicated generally by the reference character 616 to an amplifier circuit 618. One output of a differential receiver transmitter indicated generally by the reference character 620 is fed by a channel 622 to the amplifier 618, the output of which is fed by a channel 624 to a servomotor 626 which provides one of the inputs for the differential receiver transmitter 620 through a linkage 628. The output of the transmitter unit of the receiver transmitter 620 is fed by a channel 630 to an amplifier circuit 632. A receiver, indicated generally by the reference character 634 is associated with the transmitter unit of the receiver transmitter 620. A channel 636 feeds the output of receiver 634 to the amplifier 632, the output of which is fed by a channel 637 to a servomotor 638 which drives the recorder of receiver 634 through a linkage 640.

In operation of our pulse synchronous system, both motors 42 and 56 rotate at substantially the same synchronous speed. As magnet 12 moves past reference pickup 14, it induces an electrical impulse in the pickup which is fed to the relay winding T of the control circuit 22. As shaft 52 continues to rotate, magnet 12 induces an electrical impulse in the transmitter data pickup 18. Inductive couplings 66 and 78 feed this impulse to the receiver recorder 32 which records the pulse on disk 26. As disk 26 rotates, the pulse recorded on the disk by recorder 32 induces an electrical impulse in pickup 28 which feeds the pulse to the winding R of the control circuit 22. As has been explained hereinabove, a series of pairs of the pulses, each including a transmitter and a receiver pulse, is fed to control circuit 22. The spacing between the pulses of a pair is a measure of the difference in angular position of pickup 18 and recorder 32. The order of the pulses indicates which of the pickup 18 or recorder 32 leads. If the receiver pulse precedes the transmitter pulse, shaft 30 must rotate receiver recorder 32 in a counterclockwise direction as viewed in FIGURE 1 toward the synchronous position. If the transmitter pulse precedes the receiver pulse, shaft 30 must drive head 32 in a clockwise direction as viewed in FIGURE 3 toward synchronous position. As has also been explained hereinabove, if the direction of drive of motor 40 is reversed, each time the two transmitter or two receiver pulses occur successively in time, recorder 32 is always being driven toward the synchronous position. The arrangement of relays and switches of control circuit 22 ensures that recorder 32 is continuously driven toward synchronous position by reversing the direction of drive of motor 40 each time two transmitter or two receiver pulses occur successively. Also as is explained hereinabove, the erase head 122 is energized during alternate revolutions of the motors 42 and 56 to remove the pulse recorded on disk 26 by recorder 32.

It will be seen that we have accomplished the objects of our invention. We have provided a pulse synchronous system for producing groups of pairs of pulses in which the interval on a time base between the pulses of a pair is proportional to the difference in angular position of a pair of movable members. Our system is adapted to transmit angular position data in pulse form. It is particularly suitable for use with digital computers or other devices requiring a pulse input. It does not employ the brushes and slip rings of synchronous systems of the prior art. It is therefore more reliable than the systems of the prior art. Dual systems may readily be constructed in which the transmitter and receiver units each require only a single synchronous motor.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A pulse synchronous system including in combination a stationary transmitter reference head, a transmitter data head, movable means for positioning said transmitter data head with respect to the transmitter reference head, means for inducing respective transmitter reference and transmitter data pulses in the transmitter heads, a stationary receiver reference head, a receiver data head, movable means for positioning said receiver data head with respect to said receiver reference head, means for feeding the transmitter data pulse to the receiver data head to produce a receiver data pulse, means for recording said receiver data pulse, said recording means being synchronous with said inducing means and a receiver reference head for reading said recorded pulse to produce a receiver reference pulse, the spacing between said reference pulses on a time base being proportional to the difference in position of the respective data heads with respect to the reference heads.

2. A pulse synchronous system including in combination a stationary transmitter reference head, a transmitter data head, movable means for positioning said transmitter data head with respect to the transmitter reference head, means for producing a transmitter reference pulse and a transmitter data pulse in the respective transmitter reference and data heads, the spacing between which pulses on a time base is proportional to the displacement of said transmitter data head from said transmitter reference head, a stationary receiver reference head, a receiver data head, movable means for positioning said receiver data head with respect to said receiver reference head, means for producing a receiver data pulse and a receiver reference pulse in the respective receiver reference and data heads, said transmitter pulse-producing means being synchronous with said receiver pulse-producing means, the spacing between said receiver pulses on a time base being proportional to the displacement of the receiver data head from the receiver reference head, and means for comparing the transmitter and receiver pulses to produce a pair of output pulses the spacing between which on a time base is proportional to the difference in displacements of said transmitter and receiver data heads from their respective associated reference heads.

3. A pulse synchronous system including in combination a transmitter having a data input shaft adapted to be positioned with respect to an arbitrary reference point, means for producing a transmitter reference pulse and a transmitter data pulse, the spacing between which pulses on a time base is proportional to the angular displacement of the transmitter data shaft from said reference point, a receiver having a data input shaft adapted to be positioned with respect to a reference point corresponding to said transmitter reference point, means for producing a receiver data pulse and a receiver reference pulse, said receiver pulse-producing means being synchronous with said transmitter pulse-producing means, the spacing between said receiver pulses on a time base being proportional to the displacement of the receiver data shaft from the receiver reference point and means for comparing the transmitter and receiver pulses to produce a pair of output pulses, the spacing between said output pulses on a time base being proportional to the difference in displacements of said transmitter and receiver data shafts.

4. A pulse synchronous system as in claim 3 including means responsive to said output pulses for driving said receiver data input shaft to a position corresponding to the position of said transmitter data input shaft to reduce the spacing between said output pulses to zero.

5. A pulse synchronous system including in combination a stationary transmitter reference magnetic pickup, a transmitter data input shaft, a transmitter data magnetic pickup driven by said transmitter data shaft, said transmitter data input shaft being adapted to be driven to position said transmitter data pickup with respect to said transmitter reference pickup, a magnet, said magnet being adapted to be driven past said transmitter reference and said transmitter data pickups to produce transmitter reference and data pulses, a stationary receiver reference magnetic pickup, a receiver data input shaft, a receiver data recorder driven by said receiver data input shaft, said receiver data input shaft being adapted to be driven to position said receiver recorder with respect to said receiver reference pickup, a receiver recording disk positioned adjacent said receiver data recorder and said receiver reference pickup means for coupling said transmitter data pickup to said receiver recorder to record a receiver data pulse on said disk, said disk being adapted to be driven with respect to said receiver reference head whereby a recorded pulse induces a receiver reference pulse in said receiver reference pickup, and means for driving said magnet and said disk in synchronism to produce a series of pairs of pulses each of which pairs includes a transmitter reference pulse and a receiver reference pulse, the spacing on a time base between the pulses of a pair being proportional to the difference in relative angular position of said transmitter data head and said receiver data head.

6. A pulse synchronous system as in claim 5 including a two-phase motor, means connecting said motor to said receiver data input shaft to drive the shaft, and means responsive to said pairs of pulses for energizing said motor to drive said receiver recorder to a position corresponding to the position of said transmitter data pickup.

7. A pulse synchronous system as in claim 5 including a receiver erase head adapted to erase recorded pulses from said receiver recording disk, and means responsive to said pairs of pulses for energizing said erase head on alternate revolutions of said disk.

8. A pulse synchronous system as in claim 5 including a two-phase motor, means for connecting said motor to said receiver data input shaft for driving the shaft, means responsive to said pairs of pulses for energizing said motor to drive said receiver data input shaft to a position corresponding to the position of said transmitter data input shaft, said motor energizing means including means responsive to the order of the pairs of pulses occurring in sequence for reversing said motor when said receiver data recorder passes through the position corresponding to the transmitter data pickup.

9. A pulse synchronous system as in claim 5 in which said coupling means includes a first winding connected to said transmitter data head, a stationary winding electromagnetically coupled to said first winding, and means for coupling said stationary winding to said receiver recorder.

10. A pulse synchronous system as in claim 5 in which said means for driving said magnet and said disk comprises a common drive shaft carrying said disk and said magnet for rotation therewith, and means for driving said shaft.

11. A pulse synchronous system as in claim 5 in which said coupling means comprises electromagnetic means.

12. A pulse synchronous system as in claim 5 in which said coupling means comprises a primary winding carried by said transmitter data shaft for rotation therewith, a stationary secondary winding electromagnetically coupled to said primary winding, a stationary primary winding connected to said stationary secondary winding, and a secondary winding carried by said receiver data shaft for rotation therewith.

13. In a pulse synchronous system a dual transmitter including a first stationary reference pickup, a first data input shaft, a first data pickup driven by said data input shaft, a second stationary reference pickup, a second data input shaft, a second data pickup driven by said second data input shaft, said data input shafts being adapted to drive the respective data pickups to position them with respect to their associated reference pickups, and means including a common drive shaft for inducing respective pulses in said first reference pickup and first data pickup and respective pulses in said second reference pickup and said second data pickup.

14. In a pulse synchronous system a dual receiver including a first stationary reference pickup, a first data input shaft, a first receiver recorder driven by said first data input shaft, a second stationary reference pickup, a second data input shaft, a second receiver recorder driven by said second data input shaft, and means including a common drive shaft for translating respective pulses fed to said first and second recorders to the respective receiver reference pickups to produce respective receiver reference pulses.

15. In a pulse synchronous system a differential receiver-transmitter including a stationary receiver reference pickup, a receiver data recorder, means for translating a pulse fed to said recorder to said reference pickup, a transmitter reference pickup, a transmitter data pickup, a transmitter data input shaft for driving said transmitter data pickup, means for inducing respective transmitter reference and data pulses in said transmitter reference pickup and said transmitter data pickup, means including a common drive shaft for driving said means for translating and said inducing means, and means including a common data input shaft for positioning said receiver data recorder and said transmitter reference pickup.

References Cited in the file of this patent
UNITED STATES PATENTS

| | | |
|---|---|---|
| 2,680,241 | Gridley | June 1, 1954 |
| 2,732,025 | Lee | Jan. 24, 1956 |
| 2,734,188 | Jacobs | Feb. 7, 1956 |
| 2,740,952 | Jacobs | Apr. 3, 1956 |
| 2,770,798 | Roth | Nov. 13, 1956 |
| 2,775,755 | Sink | Dec. 25, 1956 |